United States Patent
Phelps

(10) Patent No.: US 12,497,894 B2
(45) Date of Patent: Dec. 16, 2025

(54) GAS TURBINE ENGINE

(71) Applicant: ROLLS-ROYCE plc, London (GB)

(72) Inventor: Benedict R. Phelps, Derby (GB)

(73) Assignee: Rolls-Royce plc, London (GB)

(*) Notice: Subject to any disclaimer, the term of this patent is extended or adjusted under 35 U.S.C. 154(b) by 6 days.

(21) Appl. No.: 18/406,296

(22) Filed: Jan. 8, 2024

(65) Prior Publication Data

US 2024/0337218 A1 Oct. 10, 2024

(30) Foreign Application Priority Data

Jan. 27, 2023 (GB) ...................................... 2301166

(51) Int. Cl.
*F01D 5/14* (2006.01)
*F04D 29/54* (2006.01)
*F01D 9/04* (2006.01)

(52) U.S. Cl.
CPC ............. *F01D 5/141* (2013.01); *F01D 5/145* (2013.01); *F04D 29/544* (2013.01); *F01D 9/041* (2013.01)

(58) Field of Classification Search
CPC .......... F01D 5/141; F01D 9/041; F01D 5/145; F04D 29/544
See application file for complete search history.

(56) References Cited

U.S. PATENT DOCUMENTS

| | | | |
|---|---|---|---|
| 7,374,403 B2 * | 5/2008 | Decker | F01D 5/141 416/223 R |
| 10,046,424 B2 | 8/2018 | Reynolds et al. | |
| 10,352,331 B2 | 7/2019 | Gallagher et al. | |
| 11,434,765 B2 * | 9/2022 | Sozio | F01D 5/141 |
| 11,480,063 B1 * | 10/2022 | Miller | F01D 9/041 |
| 11,536,146 B2 * | 12/2022 | Souverein | F01D 9/041 |

(Continued)

FOREIGN PATENT DOCUMENTS

| | | |
|---|---|---|
| EP | 3179048 A1 | 6/2017 |
| EP | 3608518 A1 | 2/2020 |
| EP | 3808963 A1 | 4/2021 |

OTHER PUBLICATIONS

Author Leichtbau-Zentrum Sachsen GmbH; Title Hybrid fan outlet guide vane for aircraft engine; Date Jul. 11, 2019 (Year: 2019).*

(Continued)

*Primary Examiner* — Nathaniel E Wiehe
*Assistant Examiner* — Art Golik
(74) *Attorney, Agent, or Firm* — Shumaker & Sieffert, P.A.

(57) ABSTRACT

A gas turbine engine for an aircraft comprises: an engine core comprising a turbine, a compressor, and a core shaft connecting the turbine to the compressor; a fan located upstream of the engine core, the fan comprising a plurality of fan blades; a bypass duct delimited by a bypass duct inner wall and a bypass duct outer wall and located radially outwardly from the engine core and downstream of the fan; and an outlet guide vane assembly, located within the bypass duct and, comprising a plurality of outlet guide vanes distributed circumferentially within the bypass duct, each outlet guide vane extending radially along a span between the bypass duct inner wall and the bypass duct outer wall, wherein a space-chord ratio of at least one outlet guide vane, at 50% of the span length from the bypass duct inner wall, is less than 0.72.

11 Claims, 4 Drawing Sheets

(56) References Cited

U.S. PATENT DOCUMENTS

| | | | |
|---|---|---|---|
| 11,781,506 B2 * | 10/2023 | Kupratis | F02K 3/077 60/792 |
| 2017/0314562 A1 * | 11/2017 | Rose | F01D 5/141 |
| 2021/0164392 A1 * | 6/2021 | Harvey | F01D 15/10 |

OTHER PUBLICATIONS

European search report dated Jun. 17, 2024 issued in EP Patent Application No. 24150021.4.
Great Britain search report dated Jul. 6, 2023, issued in GB Patent Application No. 2301166.1.

* cited by examiner

GAS TURBINE ENGINE

CROSS-REFERENCE TO RELATED APPLICATIONS

This specification is based upon and claims the benefit of priority from UK Patent Application Number 2301166.1 filed on Jan. 27, 2023, the entire contents of which are incorporated herein by reference.

BACKGROUND

Technical Field

The present disclosure relates to a gas turbine engine.

Description of the Related Art

Gas turbine engines with lower specific thrust (and therefore higher flows for a given thrust) would tend to have larger diameter fan outlet guide vane (FOGV) rings and nacelle in order to avoid high peak Mach numbers on or near FOGVs surfaces. Larger diameter FOGVs rings and nacelle may cause a number of disadvantages: higher nacelle drag and weight, lower FOGVs stiffness, and higher weight in fan system to recover such stiffness.

SUMMARY

According to a first aspect there is provided a gas turbine engine for an aircraft comprising:
an engine core comprising a turbine, a compressor, and a core shaft connecting the turbine to the compressor;
a fan located upstream of the engine core, the fan comprising a plurality of fan blades;
a bypass duct delimited by a bypass duct inner wall and a bypass duct outer wall and located radially outwardly from the engine core and downstream of the fan; and
an outlet guide vane assembly, located within the bypass duct and, comprising a plurality of outlet guide vanes distributed circumferentially within the bypass duct, each outlet guide vane extending radially along a span between the bypass duct inner wall and the bypass duct outer wall, wherein a space-chord ratio of at least one outlet guide vane, at 50% of the span length from the bypass duct inner wall, is less than 0.72,
wherein the space-chord ratio is defined by an average spacing of outlet guide vanes at a respective span height divided by a true chord length of the respective outlet guide vane at the respective span height, wherein the average spacing of outlet guide vanes at the respective span height is defined as the circumference of the bypass duct at the respective span height ($2\pi r$, where r is the radius at the respective span height from a principal rotational axis of the gas turbine engine) divided by the number of outlet guide vanes (NV), ($2\pi r/NV$).

It has been found that the lower space-chord ratio at 50% of the span length results in a reduced risk of shock induced buffet, by reducing the local flow speed across the outlet guide vane.

In the present disclosure, the span length is the length of the span of the respective outlet guide vane between the bypass duct inner wall and the bypass duct outer wall.

A point at 0% of the span length corresponds to a radially innermost part of the outlet guide vane at the bypass duct inner wall and a point at 100% of the span length corresponds to a radially outermost part of the outlet guide vane at the bypass duct outer wall.

In the present disclosure, a true chord length for a given cross-section is the distance along a camber line (which would typically be a curved line) between a leading edge and a trailing edge of an aerofoil in that cross-section. Accordingly, the true chord length would typically be the length of a curved line. Note that this is different to what might conventionally be referred to as the chord length, which would be the length of a straight line drawn between the leading edge and the trailing edge of the aerofoil in that cross-section.

Reference to a cross-section through the outlet guide vane at a given percentage along the aerofoil span (or a given percentage span position) in the present disclosure may mean a section through the aerofoil in a plane defined by:
a point on the leading edge of the aerofoil, A, that is at that percentage of the span along the leading edge from a leading edge hub to a leading edge tip, which may be defined as a radius R1 from the engine central axis of rotation;
a point on the trailing edge of the aerofoil, B, that is at that percentage of the span along the trailing edge from a trailing edge hub to a trailing edge tip, which may be defined as radius R2 from the engine central axis of rotation;
the percentage span at radius R1 is the same as the percentage span at radius R2; and
a cone with constant cone angle C which passes through point A and B, and a central axis co-incident with the engine central axis of rotation.

It may be that at 50% of the span length from the bypass duct inner wall, the space-chord ratio of the at least one outlet guide vane is less than 0.71, 0.7, 0.69, 0.68, 0.67, 0.66, 0.65, 0.64, 0.63, 0.62, 0.61, or 0.6.

It may be that at 70% of the span length from the bypass duct inner wall, the space-chord ratio of the at least one outlet guide vane is less than 0.79, 0.78, 0.77, 0.76, 0.75, 0.74, 0.73, 0.72, 0.71, or 0.7.

It may be that at 50% of the span length from the bypass duct inner wall, the space-chord ratio of the at least one outlet guide vane is more than 0.4, or more than 0.41, 0.42, 0.43, 0.44, 0.45, 0.46, 0.47, 0.48, 0.49, or 0.5. It may be that at 70% of the span length from the bypass duct inner wall, the space-chord ratio of the at least one outlet guide vane is more than 0.48, or more than 0.49, 0.50, 0.51, 0.52, 0.53, 0.54, 0.55, 0.56, 0.57, 0.58, 0.59 or 0.6.

It may be that the space-chord ratio (s/c) of the at least one outlet guide vane, at a point from 50% to 70% of the span length from the bypass duct inner wall, is less than or equal to 0.65+0.60*(span height−0.5) where the span height is the proportion of the span length from the bypass duct inner wall at said point. For example, at a point 65% of the span length from the bypass duct inner wall, the span height would be equal to 0.65 and the space-chord ratio would be equal to or less than 0.74. It may be that the space-chord ratio (s/c) of the at least one outlet guide vane, at a point from 50% to 70% of the span length from the bypass duct inner wall, is less than or equal to x+0.60*(span height−0.5), where x is 0.64, 0.63, 0.62, 0.61, 0.6, 0.59, 0.58, 0.57, 0.56, or 0.55 and the span height is the proportion of the span length from the bypass duct inner wall at said point.

It may be that the space-chord ratio of at least one outlet guide vane at 70% of the span length from the bypass duct inner wall, is at least 1.21 times and/or less than 1.45 times greater than the space-chord ratio of the respective outlet guide vane at 50% of the span length from the bypass duct inner wall.

It may be that the at least one outlet guide vane comprises each and every outlet guide vane of the plurality of outlet guide vanes of the outlet guide vane assembly in the bypass duct.

According to a second aspect there is provided a gas turbine engine for an aircraft comprising:
an engine core comprising a turbine, a compressor, and a core shaft connecting the turbine to the compressor;
a fan located upstream of the engine core, the fan comprising a plurality of fan blades;
a bypass duct delimited by a bypass duct inner wall and a bypass duct outer wall and located radially outwardly from the engine core and downstream of the fan; and
an outlet guide vane assembly, located within the bypass duct and, comprising a plurality of outlet guide vanes distributed circumferentially within the bypass duct, each outlet guide vane extending radially along a span between the bypass duct inner wall and the bypass duct outer wall,
wherein a space-chord ratio of at least one outlet guide vane, at a point from 50% to 70% of the span length from the bypass duct inner wall, is less than 0.72, wherein the space-chord ratio is defined by an average spacing of outlet guide vanes at a respective span height divided by the true chord length of the respective outlet guide vane at the respective span height, wherein the average spacing of outlet guide vanes at the respective span height is defined as the circumference of the bypass duct at the respective span height ($2\pi r$, where r is the radius at the respective span height from a principal rotational axis of the gas turbine engine) divided by the number of outlet guide vanes (NV), ($2\pi r/NV$).

It has been found that the lower space-chord ratio at a point from 50% to 70% of the span length results in a reduced risk of shock induced buffet, by reducing the local flow speed across the outlet guide vane.

It may be that the space-chord ratio of the at least one outlet guide vane, at a point from 50% to 70% of the span length from the bypass duct inner wall, is less than 0.71, 0.70, 0.69, 0.68, 0.67, 0.66, 0.65, 0.64, 0.63, 0.62, 0.61, or 0.6.

It may be that every point from 50% to 70% of the span length of the at least one outlet guide vane from the bypass duct inner wall has a space-chord ratio of less than 0.79. It may be that every point from 50% to 70% of the span length of the at least one outlet guide vane from the bypass duct inner wall has a space-chord ratio of less than 0.78, 0.77, 0.76, 0.75, 0.74, 0.73, 0.72, 0.71 or 0.7.

It may be that the space-chord ratio of the at least one outlet guide vane, at a point from 50% to 70% of the span length from the bypass duct inner wall, is more than 0.4, 0.41, 0.42, 0.43, 0.43, 0.44, 0.45, 0.46, 0.47, 0.48, 0.49, or 0.5.

It may be that the space-chord ratio of the at least one outlet guide vane, at every point from 50% to 70% of the span length from the bypass duct inner wall, is more than 0.4, 0.41, 0.42, 0.43, 0.43, 0.44, 0.45, 0.46, 0.47, 0.48, 0.49, or 0.5.

For example, the space-chord ratio of at least one outlet guide vane, at a point from 50% to 70% of the span length from the bypass duct inner wall, may be in the range of from 0.4 to 0.72, or from 0.5 to 0.72. The space-chord ratio of at least one outlet guide vane, at every point from 50% to 70% of the span length from the bypass duct inner wall, may be in the range of from 0.4 to 0.79, or from 0.5 to 0.79.

It may be that the space-chord ratio of the at least one outlet guide vane, at a point from 50% to 65% of the span length from the bypass duct inner wall, is less than 0.72, 0.71, 0.70, 0.69, 0.68, 0.67, 0.66, 0.65, 0.64, 0.63, 0.62, 0.61, or 0.6.

It may be that the space-chord ratio of the at least one outlet guide vane, at every point from 50% to 65% of the span length from the bypass duct inner wall, is less than 0.72, 0.71, 0.70, 0.69, 0.68, 0.67, 0.66, 0.65, 0.64, 0.63, 0.62, 0.61, or 0.6.

It may be that the space-chord ratio of the at least one outlet guide vane, at a point from 50% to 65% of the span length from the bypass duct inner wall, is more than 0.4, 0.42, 0.44, 0.46, 0.48, 0.50, 0.52, or 0.54. It may be that the space-chord ratio of the at least one outlet guide vane, at every point from 50% to 65% of the span length from the bypass duct inner wall, is more than 0.4, 0.42, 0.44, 0.46, 0.48, 0.50, 0.52, or 0.54.

For example, the space-chord ratio of at least one outlet guide vane, at a point from 50% to 65% of the span length from the bypass duct inner wall, may be in the range of from 0.4 to 0.72, or from 0.5 to 0.72. The space-chord ratio of at least one outlet guide vane, at every point from 50% to 65% of the span length from the bypass duct inner wall, may be in the range of from 0.4 to 0.72, or from 0.5 to 0.72.

It may be that the space-chord ratio of the at least one outlet guide vane, at a point from 65% to 70% of the span length from the bypass duct inner wall, is less than 0.79, 0.78, 0.77, 0.76, 0.75, 0.74, 0.73, 0.72, 0.71, or 0.7.

It may be that the space-chord ratio of the at least one outlet guide vane, at every point from 65% to 70% of the span length from the bypass duct inner wall, is less than 0.79, 0.78, 0.77, 0.76, 0.75, 0.74, 0.73, 0.72, 0.71, or 0.7.

It may be that the space-chord ratio of the at least one outlet guide vane, at a point from 65% to 70% of the span length from the bypass duct inner wall, is more than 0.54, 0.56, 0.58, 0.60, 0.62, 0.64, or 0.66.

It may be that the space-chord ratio of the at least one outlet guide vane, at every point from 65% to 70% of the span length from the bypass duct inner wall, is more than 0.54, 0.56, 0.58, 0.60, 0.62, 0.64, or 0.66.

For example, the space-chord ratio of at least one outlet guide vane, at a point from 65% to 70% of the span length from the bypass duct inner wall, may be in the range of from 0.54 to 0.79, or from 0.66 to 0.79. The space-chord ratio of at least one outlet guide vane, at every point from 65% to 70% of the span length from the bypass duct inner wall, may be in the range of from 0.54 to 0.79, or from 0.66 to 0.79.

It may be that the space-chord ratio (s/c) of the at least one outlet guide vane, at a point from 50% to 70% of the span length from the bypass duct inner wall, is less than or equal to $0.65+0.60*(\text{span height}-0.5)$ where the span height is defined as a proportion of the span length from the bypass duct inner wall at said point. For example, at a point 60% of the span length from the bypass duct inner wall, the span height would be 0.6 and the space-chord ratio would be equal or less than 0.71. It may be that the space-chord ratio (s/c) of the at least one outlet guide vane, at a point from 50-70% of the span length from the bypass duct inner wall, is less than or equal to $x+0.60*(\text{span height}-0.5)$, where x is 0.64, 0.63, 0.62, 0.61, 0.6, 0.59, 0.58, 0.57, 0.56, or 0.55 and the span height is the proportion of the span length from the bypass duct inner wall at said point.

It may be that the at least one outlet guide vane comprises each and every outlet guide vane of the plurality of outlet guide vanes of the outlet guide vane assembly in the bypass duct.

According to a third aspect, there is provided a gas turbine engine for an aircraft comprising:
an engine core comprising a turbine, a compressor, and a core shaft connecting the turbine to the compressor;
a fan located upstream of the engine core, the fan comprising a plurality of fan blades;
a bypass duct delimited by a bypass duct inner wall and a bypass duct outer wall and located radially outwardly from the engine core and downstream of the fan; and
an outlet guide vane assembly, located within the bypass duct and, comprising a plurality of outlet guide vanes distributed circumferentially within the bypass duct, each outlet guide vane extending radially along a span between the bypass duct inner wall and a bypass duct outer wall,
wherein a space-chord ratio of at least one outlet guide vane at 70% of the span length from the bypass duct inner wall, is at least 1.21 times, and less than 1.45 times, greater than the space-chord ratio of the respective outlet guide vane at 50% of the span length from the bypass duct inner wall, wherein the space-chord ratio is defined by an average spacing of outlet guide vanes at a respective span height divided by the true chord length of the respective outlet guide vane at the respective span height, wherein the average spacing of outlet guide vanes at the respective span height is defined as the circumference of the bypass duct at the respective span height ($2\pi r$, where r is the radius at the respective span height from a principal rotational axis of the gas turbine engine) divided by the number of outlet guide vanes (NV), ($2\pi r/NV$).

It has also found that having a space-chord ratio at 70% of the span length from the bypass duct inner wall which is at least 1.21 times, and less than 1.45 times, greater than the space-chord ratio at 50% of the span length from the bypass duct inner wall reduces the peak Mach number of flow, in use.

It may be that the space-chord ratio of at least one outlet guide vane at 70% of the span length from the bypass duct inner wall, is at least 1.22, 1.23, 1.24, 1.25, 1.26, 1.27, 1.28, 1.29, or 1.30 times greater than the space-chord ratio of the respective outlet guide vane at 50% of the span length from the bypass duct inner wall, It may be that at 70% of the span length from the bypass duct inner wall, the space-chord ratio of the at least one outlet guide vane is less than 1.44, 1.43, 1.42, 1.41, 1.40, 1.39, 1.38, 1.37, 1.36, or 1.35 times greater than the space-chord ratio of the respective outlet guide vane at 50% of the span length from the bypass duct inner wall.

It may be that at 70% of the span length from the bypass duct inner wall, the space-chord ratio of the at least one outlet guide vane is less than 0.79, 0.78, 0.77, 0.76, 0.75, 0.74, 0.73, 0.72, 0.71, or 0.7.

It may be that the space-chord ratio of the at least one outlet guide vane at 50% of the span length from the bypass duct inner wall is less than 0.72, preferably less than 0.70, more preferably less than 0.65.

It has been found that the lower space-chord ratio at a point between 50-70%, and/or at 50% and/or 70% of the span length results in a reduced risk of shock induced buffet, by reducing the local flow speed across the outlet guide vane.

It may be that the space-chord ratio (s/c) of the at least one outlet guide vane, at a point from 50% to 70% of the span length from the bypass duct inner wall, is less than or equal to 0.65+0.60*(span height−0.5) where the span height is defined as the proportion of the span length from the bypass duct inner wall at said point. For example, at a point 65% of the span length from the bypass duct inner wall, the span height would be 0.65 and the space-chord ratio would be equal or less than 0.74. It may be that the space-chord ratio (s/c) of the at least one outlet guide vane, at a point from 50-70% of the span length from the bypass duct inner wall, is less than or equal to x+0.60*(span height−0.5), where x is 0.64, 0.63, 0.62, 0.61, 0.6, 0.59, 0.58, 0.57, 0.56, or 0.55 and the span height is the proportion of the span length from the bypass duct inner wall at said point.

In any of the aspects described above, one or more of the following features may apply.

It may be that the at least one outlet guide vane comprises a majority of outlet guide vanes of the plurality of outlet guide vanes of the outlet guide vane assembly in the bypass duct.

It may be that the at least one outlet guide vane comprises each and every outlet guide vane of the plurality of outlet guide vanes of the outlet guide vane assembly in the bypass duct.

It may be that the gas turbine engine is in accordance with any of the first, second or third aspect, and it may be that the gas turbine engine further comprises a gearbox configured to receive an input from the core shaft and output drive to the fan so as to drive the fan at a lower rotational speed than the core shaft. The gearbox may have a gear ratio in a range of from 3 to 4.2, or in the range of from 3.1 to 4.2, or in the range of from 3.2 to 4.0.

It may be that the gas turbine engine is in accordance with any of the first, second or third aspect, and it may be that the turbine is a first turbine, the compressor is a first compressor, and the core shaft is a first core shaft;
the engine core further comprises a second turbine, a second compressor, and a second core shaft connecting the second turbine to the second compressor; and
the second turbine, second compressor, and second core shaft are arranged to rotate at a higher rotational speed than the first core shaft.

In any of the first, second, and third aspect the fan may have a diameter in a range of from 210 cm to 380 cm, or in a range of from 215 cm to 380 cm, or in a range of from 240 cm to 380 cm, or in a range of from 300 cm to 370 cm, or in a range of from 330 cm to 360 cm. In any of the first, second, and third aspect the outlet guide vane assembly may be located axially between the fan and a bifurcation located in the bypass duct. The bifurcation may have a leading edge and a trailing edge and the outlet guide vane assembly may be located axially between the fan and bifurcation trailing edge, or between the fan and the bifurcation leading edge.

As noted elsewhere herein, the present disclosure may relate to a gas turbine engine. Such a gas turbine engine may comprise an engine core comprising a turbine, a combustor, a compressor, and a core shaft connecting the turbine to the compressor. Such a gas turbine engine may comprise a fan (having fan blades) located upstream of the engine core.

Arrangements of the present disclosure may be particularly, although not exclusively, beneficial for fans that are driven via a gearbox. Accordingly, the gas turbine engine may comprise a gearbox that receives an input from the core shaft and outputs drive to the fan so as to drive the fan at a lower rotational speed than the core shaft. The input to the gearbox may be directly from the core shaft, or indirectly from the core shaft, for example via a spur shaft and/or gear. The core shaft may rigidly connect the turbine and the compressor, such that the turbine and compressor rotate at the same speed (with the fan rotating at a lower speed).

The gas turbine engine as described and/or claimed herein may have any suitable general architecture. For example, the gas turbine engine may have any desired number of shafts that connect turbines and compressors, for example one, two or three shafts. Purely by way of example, the turbine connected to the core shaft may be a first turbine, the compressor connected to the core shaft may be a first compressor, and the core shaft may be a first core shaft. The engine core may further comprise a second turbine, a second compressor, and a second core shaft connecting the second turbine to the second compressor. The second turbine, second compressor, and second core shaft may be arranged to rotate at a higher rotational speed than the first core shaft.

In such an arrangement, the second compressor may be positioned axially downstream of the first compressor. The second compressor may be arranged to receive (for example directly receive, for example via a generally annular duct) flow from the first compressor.

The gearbox may be arranged to be driven by the core shaft that is configured to rotate (for example in use) at the lowest rotational speed (for example the first core shaft in the example above). For example, the gearbox may be arranged to be driven only by the core shaft that is configured to rotate (for example in use) at the lowest rotational speed (for example only by the first core shaft, and not the second core shaft, in the example above). Alternatively, the gearbox may be arranged to be driven by any one or more shafts, for example the first and/or second shafts in the example above.

The gearbox may be a reduction gearbox (in that the output to the fan is a lower rotational rate than the input from the core shaft). Any type of gearbox may be used. For example, the gearbox may be a "planetary" or "star" gearbox, as described in more detail elsewhere herein. The gearbox may have any desired reduction ratio (defined as the rotational speed of the input shaft divided by the rotational speed of the output shaft), for example greater than 2.5, for example in the range of from 3 to 4.2, or 3.2 to 3.8, for example on the order of or at least 3, 3.1, 3.2, 3.3, 3.4, 3.5, 3.6, 3.7, 3.8, 3.9, 4, 4.1 or 4.2. The gear ratio may be, for example, between any two of the values in the previous sentence. Purely by way of example, the gearbox may be a "star" gearbox having a ratio in the range of from 3.1 or 3.2 to 3.8. In some arrangements, the gear ratio may be outside these ranges.

In any gas turbine engine as described and/or claimed herein, a combustor may be provided axially downstream of the fan and compressor(s). For example, the combustor may be directly downstream of (for example at the exit of) the second compressor, where a second compressor is provided. By way of further example, the flow at the exit to the combustor may be provided to the inlet of the second turbine, where a second turbine is provided. The combustor may be provided upstream of the turbine(s).

The or each compressor (for example the first compressor and second compressor as described above) may comprise any number of stages, for example multiple stages. Each stage may comprise a row of rotor blades and a row of stator vanes, which may be variable stator vanes (in that their angle of incidence may be variable). The row of rotor blades and the row of stator vanes may be axially offset from each other.

The or each turbine (for example the first turbine and second turbine as described above) may comprise any number of stages, for example multiple stages. Each stage may comprise a row of rotor blades and a row of stator vanes. The row of rotor blades and the row of stator vanes may be axially offset from each other.

Each fan blade may be defined as having a radial span extending from a root (or hub) at a radially inner gas-washed location, or 0% span position, to a tip at a 100% span position. The ratio of the radius of the fan blade at the hub to the radius of the fan blade at the tip may be less than (or on the order of) any of: 0.4, 0.39, 0.38, 0.37, 0.36, 0.35, 0.34, 0.33, 0.32, 0.31, 0.3, 0.29, 0.28, 0.27, 0.26, or 0.25. The ratio of the radius of the fan blade at the hub to the radius of the fan blade at the tip may be in an inclusive range bounded by any two of the values in the previous sentence (i.e. the values may form upper or lower bounds), for example in the range of from 0.28 to 0.32. These ratios may commonly be referred to as the hub-to-tip ratio. The radius at the hub and the radius at the tip may both be measured at the leading edge (or axially forwardmost) part of the blade. The hub-to-tip ratio refers, of course, to the gas-washed portion of the fan blade, i.e. the portion radially outside any platform.

The radius of the fan may be measured between the engine centreline and the tip of a fan blade at its leading edge. The fan diameter (which may simply be twice the radius of the fan) may be greater than (or on the order of) any of: 210 cm, 220 cm, 230 cm, 240 cm, 250 cm (around 100 inches), 260 cm, 270 cm (around 105 inches), 280 cm (around 110 inches), 290 cm (around 115 inches), 300 cm (around 120 inches), 310 cm, 320 cm (around 125 inches), 330 cm (around 130 inches), 340 cm (around 135 inches), 350 cm, 360 cm (around 140 inches), 370 cm (around 145 inches), 380 cm (around 150 inches), 390 cm (around 155 inches), 400 cm, 410 cm (around 160 inches) or 420 cm (around 165 inches). The fan diameter may be in an inclusive range bounded by any two of the values in the previous sentence (i.e. the values may form upper or lower bounds), for example in the range of from 210 cm to 240 cm, or 250 cm to 280 cm, or 320 cm to 380 cm.

The rotational speed of the fan may vary in use. Generally, the rotational speed is lower for fans with a higher diameter. Purely by way of non-limitative example, the rotational speed of the fan at cruise conditions may be less than 2800 rpm, for example less than 2700 rpm, or less than 2600 rpm, or less than 2500 rpm, or less than 2300 rpm. Purely by way of further non-limitative example, the rotational speed of the fan at cruise conditions for an engine having a fan diameter in the range of from 210 cm to 300 cm (for example 240 cm to 280 cm or 250 cm to 270 cm) may be in the range of from 1700 rpm to 2800, for example in the range of from 1700 rpm to 2700 rpm, or in the range of from 1700 rpm to 2600 rpm, or in the range of from 1800 rpm to 2300 rpm, for example in the range of from 1900 rpm to 2100 rpm. Purely by way of further non-limitative example, the rotational speed of the fan at cruise conditions for an engine having a fan diameter in the range of from 330 cm to 380 cm may be in the range of from 1200 rpm to 2000 rpm, for example in the range of from 1300 rpm to 1800 rpm, for example in the range of from 1400 rpm to 1800 rpm.

In use of the gas turbine engine, the fan (with associated fan blades) rotates about a rotational axis. This rotation results in the tip of the fan blade moving with a velocity $U_{tip}$. The work done by the fan blades 23 on the flow results in an enthalpy rise dH of the flow. A fan tip loading may be defined as $dH/U_{tip}^2$, where dH is the enthalpy rise (for example the 1-D average enthalpy rise) across the fan and $U_{tip}$ is the (translational) velocity of the fan tip, for example at the leading edge of the tip (which may be defined as fan tip radius at leading edge multiplied by angular speed). The fan tip loading at cruise conditions may be greater than (or on the order of) any of: 0.28, 0.29, 0.30, 0.31, 0.32, 0.33, 0.34, 0.35, 0.36, 0.37, 0.38, 0.39 or 0.4 (all values being dimensionless). The fan tip loading may be in an inclusive range bounded by any two of the values in the previous sentence (i.e. the values may form upper or lower bounds), for example in the range of from 0.28 to 0.31, or 0.29 to 0.3.

Gas turbine engines in accordance with the present disclosure may have any desired bypass ratio, where the bypass ratio is defined as the ratio of the mass flow rate of the flow through the bypass duct to the mass flow rate of the flow through the core at cruise conditions. In some arrangements the bypass ratio may be greater than (or on the order of) any of the following: 10, 10.5, 11, 11.5, 12, 12.5, 13, 13.5, 14, 14.5, 15, 15.5, 16, 16.5, 17, 17.5, 18, 18.5, 19, 19.5 or 20. The bypass ratio may be in an inclusive range bounded by any two of the values in the previous sentence (i.e. the values may form upper or lower bounds), for example in the range of form 12 to 16, 13 to 15, or 13 to 14. The bypass duct may be substantially annular. The bypass duct may be radially outside the core engine. The radially outer surface of the bypass duct may be defined by a nacelle and/or a fan case.

The overall pressure ratio of a gas turbine engine as described and/or claimed herein may be defined as the ratio of the stagnation pressure upstream of the fan to the stagnation pressure at the exit of the highest pressure compressor (before entry into the combustor). By way of non-limitative example, the overall pressure ratio of a gas turbine engine as described and/or claimed herein at cruise may be greater than (or on the order of) any of the following: 35, 40, 45, 50, 55, 60, 65, 70, 75. The overall pressure ratio may be in an inclusive range bounded by any two of the values in the previous sentence (i.e. the values may form upper or lower bounds), for example in the range of from 50 to 70.

Specific thrust of an engine may be defined as the net thrust of the engine divided by the total mass flow through the engine. At cruise conditions, the specific thrust of an engine described and/or claimed herein may be less than (or on the order of) any of the following: 110 $Nkg^{-1}$ s, 105 $Nkg^{-1}$ s, 100 $Nkg^{-1}$ s, 95 $Nkg^{-1}$ s, 90 $Nkg^{-1}$ s, 85 $Nkg^{-1}$ s or 80 $Nkg^{-1}$ s. The specific thrust may be in an inclusive range bounded by any two of the values in the previous sentence (i.e. the values may form upper or lower bounds), for example in the range of from 80 $Nkg^{-1}$ s to 100 $Nkg^{-1}$ s, or 85 $Nkg^{-1}$ s to 95 $Nkg^{-1}$ s. Such engines may be particularly efficient in comparison with conventional gas turbine engines.

A gas turbine engine as described and/or claimed herein may have any desired maximum thrust. Purely by way of non-limitative example, a gas turbine as described and/or claimed herein may be capable of producing a maximum thrust of at least (or on the order of) any of the following: 130 kN, 135 kN, 140 kN, 145 kN, 150 kN, 155 kN, 160 kN, 170 kN, 180 kN, 190 kN, 200 kN, 250 kN, 300 kN, 350 kN, 400 kN, 450 kN, 500 kN, or 550 kN. The maximum thrust may be in an inclusive range bounded by any two of the values in the previous sentence (i.e. the values may form upper or lower bounds). Purely by way of example, a gas turbine as described and/or claimed herein may be capable of producing a maximum thrust in the range of from 155 kN to 170 kN, 330 kN to 420 kN, or 350 kN to 400 kN. The thrust referred to above may be the maximum net thrust at standard atmospheric conditions at sea level plus 15 degrees C. (ambient pressure 101.3 kPa, temperature 30 degrees C.), with the engine static.

In use, the temperature of the flow at the entry to the high pressure turbine may be particularly high. This temperature, which may be referred to as TET, may be measured at the exit to the combustor, for example immediately upstream of the first turbine vane, which itself may be referred to as a nozzle guide vane. At cruise, the TET may be at least (or on the order of) any of the following: 1400K, 1450K, 1500K, 1520K, 1530K, 1540K, 1550K, 1600K or 1650K. The TET at cruise may be in an inclusive range bounded by any two of the values in the previous sentence (i.e. the values may form upper or lower bounds), for example 1530K to 1600K. The maximum TET in use of the engine may be, for example, at least (or on the order of) any of the following: 1700K, 1750K, 1800K, 1850K, 1900K, 1950K or 2000K. The maximum TET may be in an inclusive range bounded by any two of the values in the previous sentence (i.e. the values may form upper or lower bounds), for example in the range of from 1800K to 1950K, or 1900K to 2000K. The maximum TET may occur, for example, at a high thrust condition, for example at a maximum take-off (MTO) condition.

A fan blade and/or aerofoil portion of a fan blade described and/or claimed herein may be manufactured from any suitable material or combination of materials. For example at least a part of the fan blade and/or aerofoil may be manufactured at least in part from a composite, for example a metal matrix composite and/or an organic matrix composite, such as carbon fibre. By way of further example at least a part of the fan blade and/or aerofoil may be manufactured at least in part from a metal, such as a titanium based metal or an aluminium based material (such as an aluminium-lithium alloy) or a steel based material. The fan blade may comprise at least two regions manufactured using different materials. For example, the fan blade may have a protective leading edge, which may be manufactured using a material that is better able to resist impact (for example from birds, ice or other material) than the rest of the blade. Such a leading edge may, for example, be manufactured using titanium or a titanium-based alloy. Thus, purely by way of example, the fan blade may have a carbon-fibre or aluminium based body (such as an aluminium lithium alloy) with a titanium leading edge.

A fan as described and/or claimed herein may comprise a central portion, from which the fan blades may extend, for example in a radial direction. The fan blades may be attached to the central portion in any desired manner. For example, each fan blade may comprise a fixture which may engage a corresponding slot in the hub (or disc). Purely by way of example, such a fixture may be in the form of a dovetail that may slot into and/or engage a corresponding slot in the hub/disc in order to fix the fan blade to the hub/disc. By way of further example, the fan blades maybe formed integrally with a central portion. Such an arrangement may be referred to as a bladed disc or a bladed ring. Any suitable method may be used to manufacture such a bladed disc or bladed ring. For example, at least a part of the fan blades may be machined from a block and/or at least part of the fan blades may be attached to the hub/disc by welding, such as linear friction welding.

The gas turbine engines described and/or claimed herein may or may not be provided with a variable area nozzle (VAN). Such a variable area nozzle may allow the exit area of the bypass duct to be varied in use. The general principles of the present disclosure may apply to engines with or without a VAN.

The fan of a gas turbine as described and/or claimed herein may have any desired number of fan blades, for example 14, 16, 18, 20, 22, 24 or 26 fan blades.

As used herein, cruise conditions have the conventional meaning and would be readily understood by the skilled person. Thus, for a given gas turbine engine for an aircraft, the skilled person would immediately recognise cruise conditions to mean the operating point of the engine at mid-cruise of a given mission (which may be referred to in the industry as the "economic mission") of an aircraft to which the gas turbine engine is designed to be attached. In this regard, mid-cruise is the point in an aircraft flight cycle at which 50% of the total fuel that is burned between top of climb and start of descent has been burned (which may be approximated by the midpoint—in terms of time and/or distance—between top of climb and start of descent). Cruise conditions thus define an operating point of the gas turbine engine that provides a thrust that would ensure steady state operation (i.e. maintaining a constant altitude and constant Mach Number) at mid-cruise of an aircraft to which it is designed to be attached, taking into account the number of engines provided to that aircraft. For example where an engine is designed to be attached to an aircraft that has two engines of the same type, at cruise conditions the engine provides half of the total thrust that would be required for steady state operation of that aircraft at mid-cruise.

In other words, for a given gas turbine engine for an aircraft, cruise conditions are defined as the operating point of the engine that provides a specified thrust (required to provide—in combination with any other engines on the aircraft—steady state operation of the aircraft to which it is designed to be attached at a given mid-cruise Mach Number) at the mid-cruise atmospheric conditions (defined by the International Standard Atmosphere according to ISO 2533 at the mid-cruise altitude). For any given gas turbine engine for an aircraft, the mid-cruise thrust, atmospheric conditions and Mach Number are known, and thus the operating point of the engine at cruise conditions is clearly defined.

Purely by way of example, the forward speed at the cruise condition may be any point in the range of from Mach 0.7 to 0.9, for example 0.75 to 0.85, for example 0.76 to 0.84, for example 0.77 to 0.83, for example 0.78 to 0.82, for example 0.79 to 0.81, for example on the order of Mach 0.8, on the order of Mach 0.85 or in the range of from 0.8 to 0.85. Any single speed within these ranges may be part of the cruise condition. For some aircraft, the cruise conditions may be outside these ranges, for example below Mach 0.7 or above Mach 0.9.

Purely by way of example, the cruise conditions may correspond to standard atmospheric conditions (according to the International Standard Atmosphere, ISA) at an altitude that is in the range of from 10000 m to 15000 m, for example in the range of from 10000 m to 12000 m, for example in the range of from 10400 m to 11600 m (around 38000 ft), for example in the range of from 10500 m to 11500 m, for example in the range of from 10600 m to 11400 m, for example in the range of from 10700 m (around 35000 ft) to 11300 m, for example in the range of from 10800 m to 11200 m, for example in the range of from 10900 m to 11100 m, for example on the order of 11000 m. The cruise conditions may correspond to standard atmospheric conditions at any given altitude in these ranges.

Purely by way of example, the cruise conditions may correspond to a forward Mach number of 0.8 and standard atmospheric conditions (according to the International Standard Atmosphere) at an altitude of 35000 ft (10668 m). At such cruise conditions, the engine may provide a known required net thrust level. The known required net thrust level is, of course, dependent on the engine and its intended application and may be, for example, a value in the range of from 20 kN to 40 kN.

Purely by way of further example, the cruise conditions may correspond to a forward Mach number of 0.85 and standard atmospheric conditions (according to the International Standard Atmosphere) at an altitude of 38000 ft (11582 m). At such cruise conditions, the engine may provide a known required net thrust level. The known required net thrust level is, of course, dependent on the engine and its intended application and may be, for example, a value in the range of from 35 kN to 65 kN.

In use, a gas turbine engine described and/or claimed herein may operate at the cruise conditions defined elsewhere herein. Such cruise conditions may be determined by the cruise conditions (for example the mid-cruise conditions) of an aircraft to which at least one (for example 2 or 4) gas turbine engine may be mounted in order to provide propulsive thrust.

According to an aspect, there is provided an aircraft comprising a gas turbine engine as described and/or claimed herein. The aircraft according to this aspect is the aircraft for which the gas turbine engine has been designed to be attached. Accordingly, the cruise conditions according to this aspect correspond to the mid-cruise of the aircraft, as defined elsewhere herein.

According to an aspect, there is provided a method of operating a gas turbine engine as described and/or claimed herein. The operation may be at the cruise conditions as defined elsewhere herein (for example in terms of the thrust, atmospheric conditions and Mach Number).

According to an aspect, there is provided a method of operating an aircraft comprising a gas turbine engine as described and/or claimed herein. The operation according to this aspect may include (or may be) operation at the mid-cruise of the aircraft, as defined elsewhere herein.

The skilled person will appreciate that except where mutually exclusive, a feature or parameter described in relation to any one of the above aspects may be applied to any other aspect. Furthermore, except where mutually exclusive, any feature or parameter described herein may be applied to any aspect and/or combined with any other feature or parameter described herein.

BRIEF DESCRIPTION OF THE DRAWINGS

Embodiments will now be described by way of example only, with reference to the Figures, in which.

DETAILED DESCRIPTION

Figure 1:
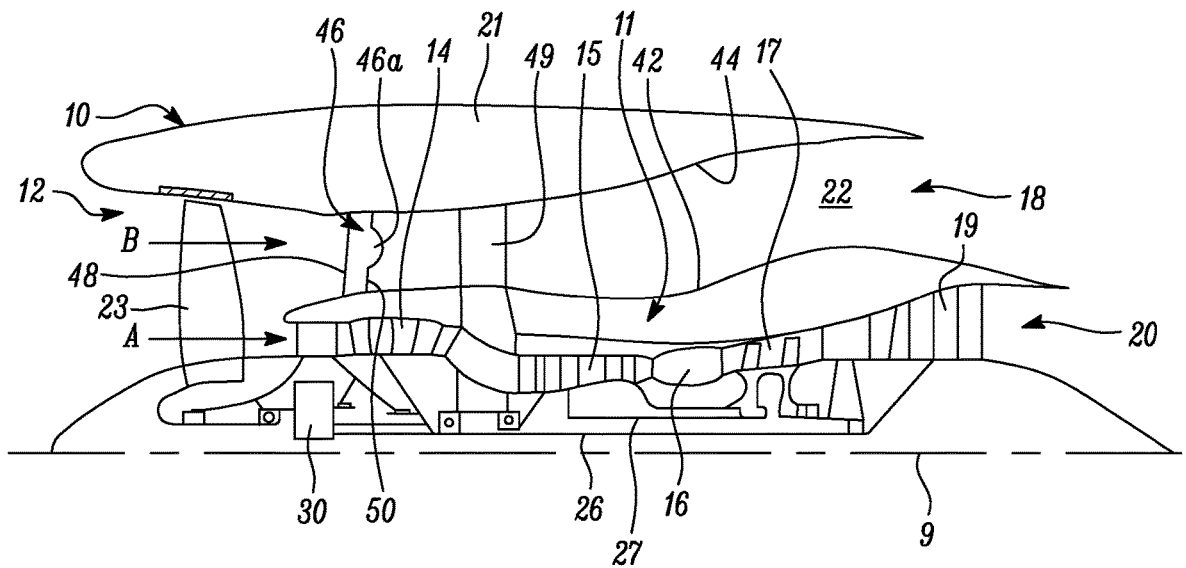
FIG. 1 is a sectional side view of a gas turbine engine.

FIG. 1 illustrates a gas turbine engine 10 having a principal rotational axis 9. The engine 10 comprises an air intake 12 and a propulsive fan 23, comprising a plurality of blades, that generates two airflows: a core airflow A and a bypass airflow B. The gas turbine engine 10 comprises a core 11 that receives the core airflow A downstream of the fan. The engine core 11 comprises, in axial flow series, a low pressure compressor 14, a high-pressure compressor 15, combustion equipment 16, a high-pressure turbine 17, a low pressure turbine 19 and a core exhaust nozzle 20. A nacelle 21 surrounds the gas turbine engine 10 and defines a bypass exhaust nozzle 18. The engine 10 comprises a bypass duct 22, located radially outwardly from the core and downstream of the fan, and delimited by a bypass duct inner wall 42 and a bypass duct outer wall 44. The bypass airflow B flows through the bypass duct 22. The fan 23 is attached to and driven by the low pressure turbine 19 via a core shaft 26 and an epicyclic gearbox 30. The fan 23 has a fan diameter in a range of from 210 cm to 380 cm; in examples the fan 23 has a fan diameter in the range of from 210 cm to 240 cm, or 250 cm to 280 cm, or 320 cm to 380 cm.

An outlet guide vane assembly 46 is located in the bypass duct 22, and comprises a plurality of outlet guide vanes 46a, which are distributed circumferentially within the bypass duct 22. Each outlet guide vane 46a extends radially between the bypass duct inner wall 42 and the bypass duct outer wall 44, along a span, and at least partially axially from a leading edge 48 to a trailing edge 50. The length of the outlet guide vane 46a along the span (i.e., between the bypass duct inner wall 42 and the bypass duct outer wall 44) is referred to herein as the span length.

A bifurcation 49 (e.g., a flow splitter) is disposed in the bypass duct 22 downstream of the outlet guide vane assembly 46, such that the outlet guide vane assembly 46 is disposed axially between the fan 23 and the bifurcation 49. The bifurcation 49 has a leading edge and a trailing edge and the outlet guide vane assembly 46 is disposed axially between the fan 23 and the bifurcation leading edge. In other embodiments, the outlet guide vane assembly 46 is disposed axially between the fan 23 and the bifurcation trailing edge. The bifurcation 49 may be an upper bifurcation; the engine 10 may further comprise a lower bifurcation arranged in the bypass duct 22 downstream of the outlet guide vane assembly 46 and radially opposite to the upper bifurcation 49.

Figure 4:
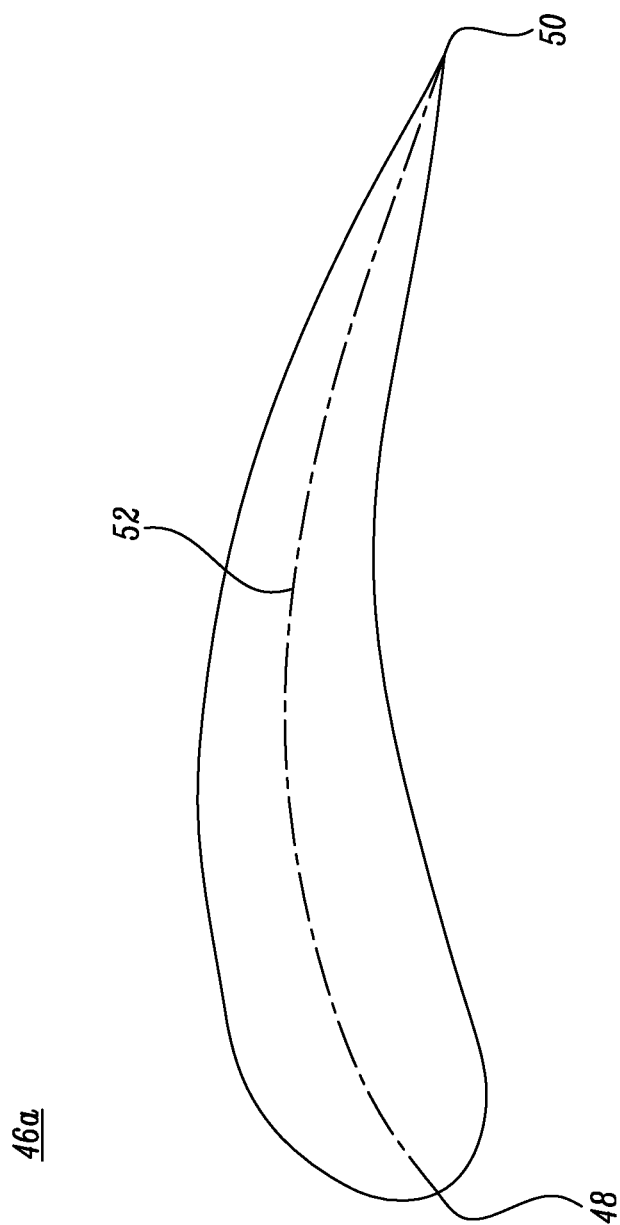
FIG. 4 is a cross-sectional view of an example outlet guide vane.

FIG. 4 shows a cross-sectional view of an outlet guide vane 46a at a particular point along its span. A true chord length of the outlet guide vane 46a, for a given cross-section at a point along the span length, is the distance along a camber line 52 (which would typically be a curved line) between the leading edge 48 and the trailing edge 50 in that cross-section. Accordingly, the true chord length would typically be the length of a curved line. Note that this is different to what might conventionally be referred to as the chord length, which would be the length of a straight line drawn between the leading edge and the trailing edge in that cross-section.

Peak surface Mach numbers in use across the outlet guide vanes 46a is typically reduced, to avoid aerodynamic buffet, by increasing the span length, which increases weight and drag of the nacelle. In this disclosure, the cross-sectional geometry of each outlet guide vane 46a along the span length is designed to reduce peak surface Mach numbers, without the need to increase the span length. The cross-sectional geometry of each outlet guide vane is defined in relation to its space-chord ratio (s/c), which varies along its span. A profile of space-chord ratio (s/c) against percentage of span length from the bypass duct inner wall 42 may be substantially identical for each outlet guide vane 46a in the outlet guide vane assembly 46. In other examples, a plurality of outlet guide vanes in the outlet guide vane assembly 46 may comprise an identical profile, and a few outlet guide vanes may comprise alternative profiles for providing additional support, for accommodating other support structures in the bypass duct 22, or for different camber standards (including directing the flow around the bifurcation(s) 49 whilst limiting incidence onto the vanes).

The space-chord ratio (s/c) is defined by an average spacing of outlet guide vanes 46a at a respective span height divided by the true chord length of the respective outlet guide vane 46a at the respective span height. The average spacing of outlet guide vanes at the respective span height is defined as the circumference of the bypass duct at the respective span height ($2\pi r$, where r is the radius at the respective span height from the centre of the gas turbine engine 10 (i.e., the principal rotational axis 9)) divided by the number of outlet guide vanes ($N_V$). Therefore, the space-chord ratio at a respective span height is defined as $2\pi r/N_V$.

Figure 5:
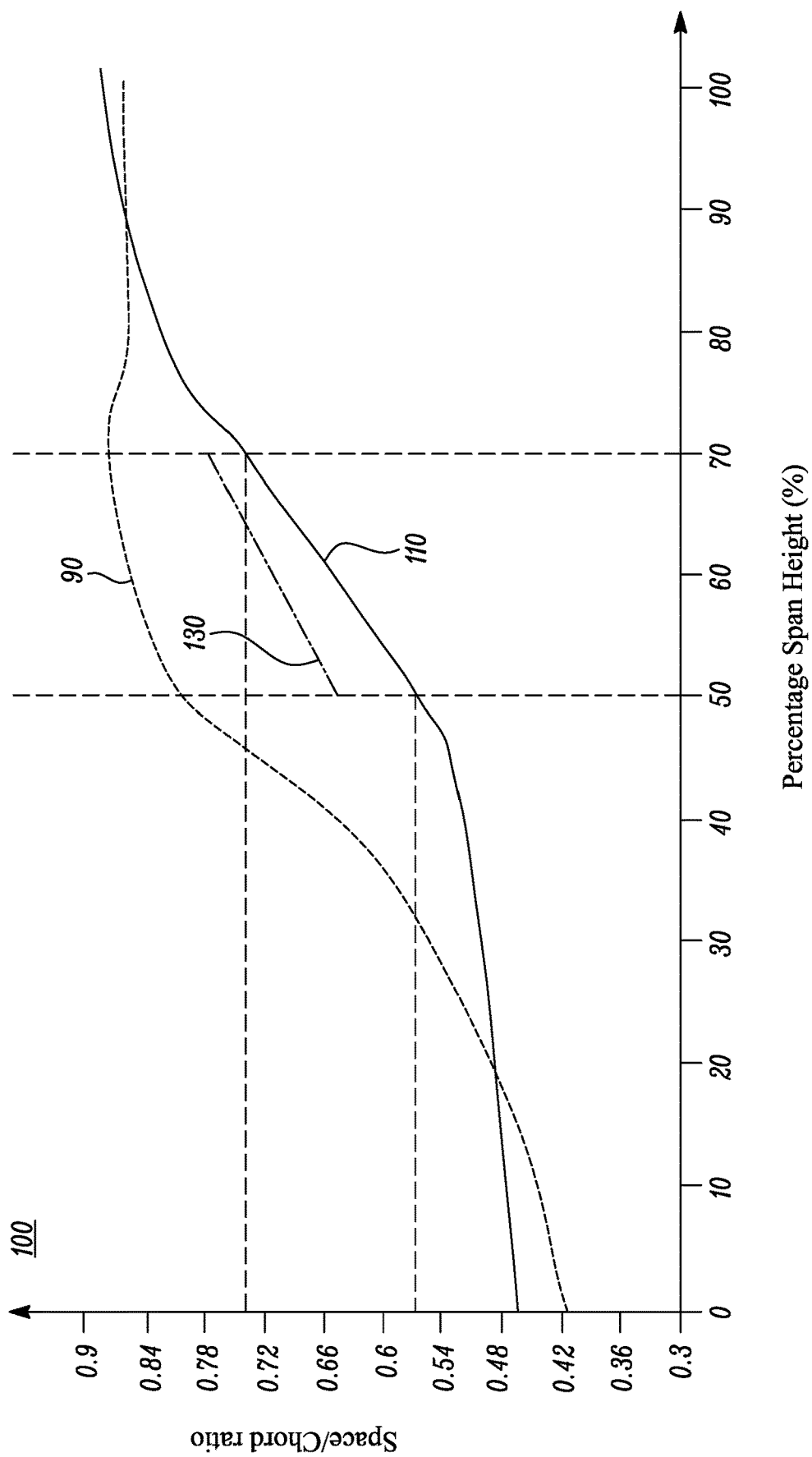
FIG. 5 is a chart showing a relationship between space-chord ratio (s/c) of outlet guide vanes against a percentage of the span length of the respective outlet guide vane.

FIG. 5 shows a chart 100 of space-chord ratio (s/c) against percentage height along the span length from the bypass duct inner wall 42. For example, at 40% of the span length from the bypass duct inner wall 42, the percentage height is 40%.

Two plots are shown on the chart 100. A first plot 90 (shown with a dotted line) shows a relationship between the space-chord ratio and the percentage height of a previously considered outlet guide vane. A second plot 110 (shown in a solid line) is a first example relationship between the space-chord ratio and the percentage height of an outlet guide vane 46a according to the disclosure. It can be seen that the space-chord ratio between approximately 50-70% of the span length is lower than the space-chord ratio of the previously considered design. The applicant has found that this lower space-chord ratio between 50-70% of the span length (resulting from a longer true chord length at this span height, giving a bulged profile shown in the axial cross-section of FIG. 1) results in lower peak Mach numbers of flow, in use.

In this example, it can be seen that the space-chord ratio at 50% of the span length from the bypass duct inner wall is approximately 0.57, and that the space-chord ratio at 70% of the span length from the bypass duct inner wall is approximately 0.74. It can be seen that every point between 50-70% of the span length, the space-chord ratio is less than 0.74 in this example.

The applicant has found more broadly that having a space-chord ratio of less than 0.72 at 50% of the span length and/or of less than 0.79 at 70% of the span length reduces the peak Mach number of flow in use. Without being bound by theory, the applicant believes that this is due to the lift force being distributed over a larger surface area.

The applicant has found that there is a trade-off between (i) added weight for each outlet guide vane 46a (due to increasing the chord length locally) and increased losses over the outlet guide vanes against (ii) reduced peak Mach numbers when reducing the space-chord ratio between 50-70% of the span length. The longer the true chord length between 50-70% of the span length, the smaller the space-chord ratio (s/c) and the lower the peak Mach number, but the more material is required to on either side of this range for sufficient stiffness of the entire outlet guide vane, increasing the weight of each outlet guide vane further.

The space-chord ratio at 50% of the span length may therefore be less than 0.71, 0.70, 0.69, 0.68, 0.67, 0.66 or 0.65, or even lower. In some examples, the space-chord ratio at 50% of the span height may be larger than 0.4, 0.41, 0.42, 0.43, 0.44, or 0.45 or higher. The space-chord ratio at 70% of the span length may therefore be less than 0.78, 0.77, 0.76, 0.75, 0.74, 0.73, or 0.72, or even lower. In some examples, the space-chord ratio at 70% of the span length may be larger than 0.48, 0.49, 0.5, 0.51, 0.52, 0.53, 0.54, or 0.55 or higher.

The applicant has also found that, having a space-chord ratio of at least one point between 50% and 70% of the span length less than 0.72 also reduces the peak Mach number of flow, in use. In other examples, the space-chord ratio anywhere between 50% and 70% of the span length may be less than 0.71, 0.70, 0.69, 0.68, 0.67, 0.66 or 0.65, or even lower. It may be that the space-chord ratio of the at least one outlet guide vane, at a point from 55% to 70% of the span length from the bypass duct inner wall 42, is less than 0.72, 0.71, 0.70, or 0.69 or even lower. In some examples, each and every point between 50-70% of the span length from the bypass duct inner wall 42 may have a space-chord ratio less than 0.79, or less than 0.78, 0.77, 0.76, 0.75 or 0.74 or even lower. It may be that the space-chord ratio of the at least one outlet guide vane, at a point from 50% to 65% of the span length from the bypass duct inner wall 42, is less than 0.72, 0.71, 0.70, or 0.69 or even lower. In some examples, each and every point between 50% and 65% of the span length from the bypass duct inner wall 42 may have a space-chord ratio less than 0.72, or less than 0.71, 0.70, 0.69, 0.68 or 0.67 or even lower.

In other examples the space-chord ratio of at least one point between 65% and 70% of the span length from the bypass duct inner wall 42, is less than 0.79, 0.78, 0.77, 0.76, 0.75, 0.74, 0.73, 0.72, 0.71, or 0.7.

In other examples the space-chord ratio anywhere between 65% and 70% of the span length from the bypass duct inner wall, is less than 0.79, 0.78, 0.77, 0.76, 0.75, 0.74, 0.73, 0.72, 0.71, or 0.7.

The applicant has also found that a space-chord ratio (s/c) of the at least one outlet guide vane, at a point from 50-70% of the span length from the bypass duct inner wall 42, being less than or equal to 0.65+0.60*(span height−0.5), where the span height is the proportion of the span length from the bypass duct inner wall 42, reduces peak Mach numbers of flow in use. For example, at a point 60% of the span length from the bypass duct inner wall, the span height would be 0.6 and the space-chord ratio would less than or equal to 0.71. This is shown as the dash-dot line 130 in FIG. 5. It may be that the space-chord ratio (s/c) of the at least one outlet guide vane, at a point from 50-70% of the span length from the bypass duct inner wall, is less than or equal to x+0.60*(span height−0.5), where x is 0.64, 0.63, 0.62, 0.61, 0.6, or 0.59 or even lower.

The applicant has also found that having a space-chord ratio at 70% of the span length from the bypass duct inner wall 42 which is at least 1.21 times and/or less than 1.45 times greater than the space-chord ratio at 50% of the span length from the bypass duct inner wall 42 reduces the peak Mach number of flow, in use. In some examples, the space-chord ratio at 70% may be a factor of 1.22, 1.23, 1.24, 1.25, 1.26, 1.27, 1.28 or even higher, larger than the space-chord ratio at 50% of the span length. In the example of FIG. 5 the space-chord ratio at 70% of the span length from the bypass duct inner wall 42 is 1.30 times greater than the space-chord ratio at 50% of the span length from the bypass duct inner wall 42. In some examples, the space-chord ratio at 70% of the span length of the outlet guide vane may be less than 1.45, 1.44, 1.43, 1.42, 1.41, 1.40, 1.39 times greater than the space-chord ratio of the respective outlet guide vane at 50% of the span length from the bypass duct inner wall 42.

Referring back to FIG. 1, in use, the core airflow A is accelerated and compressed by the low pressure compressor 14 and directed into the high pressure compressor 15 where further compression takes place. The compressed air exhausted from the high pressure compressor 15 is directed into the combustion equipment 16 where it is mixed with fuel and the mixture is combusted. The resultant hot combustion products then expand through, and thereby drive, the high pressure and low pressure turbines 17, 19 before being exhausted through the nozzle 20 to provide some propulsive thrust. The high pressure turbine 17 drives the high pressure compressor 15 by a suitable second core shaft 27. The fan 23 generally provides the majority of the propulsive thrust. The epicyclic gearbox 30 is a reduction gearbox.

Figure 2:
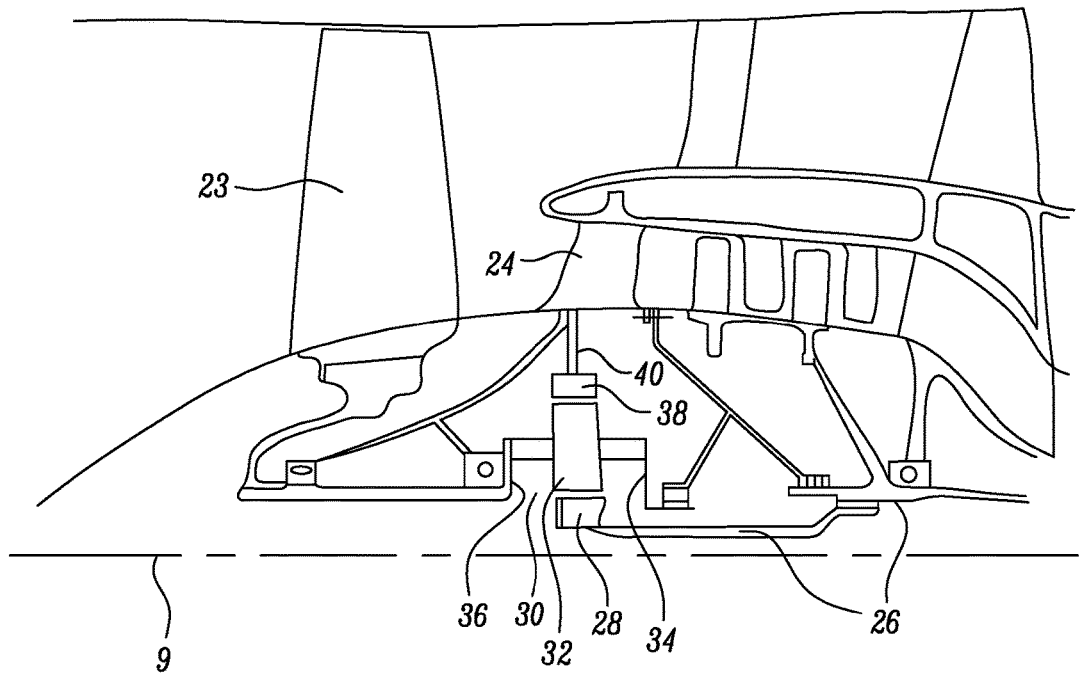
FIG. 2 is a close-up sectional side view of an upstream portion of a gas turbine engine.

An exemplary arrangement for a geared fan gas turbine engine 10 is shown in FIG. 2. The low pressure turbine 19 (see FIG. 1) drives the core shaft 26, which is coupled to a sun wheel, or sun gear, 28 of the epicyclic gear arrangement 30. Radially outwardly of the sun gear 28 and intermeshing therewith is a plurality of planet gears 32 that are coupled together by a planet carrier 34. The planet carrier 34 constrains the planet gears 32 to precess around the sun gear 28 in synchronicity whilst enabling each planet gear 32 to rotate about its own axis. The planet carrier 34 is coupled via linkages 36 to the fan 23 in order to drive its rotation about the engine axis 9. Radially outwardly of the planet gears 32 and intermeshing therewith is an annulus or ring gear 38 that is coupled, via linkages 40, to a stationary supporting structure 24.

Note that the terms "low pressure turbine" and "low pressure compressor" as used herein may be taken to mean the lowest pressure turbine stages and lowest pressure compressor stages (i.e. not including the fan 23) respectively and/or the turbine and compressor stages that are connected together by the core shaft 26 with the lowest rotational speed in the engine (i.e. not including the gearbox output shaft that drives the fan 23). In some literature, the "low pressure turbine" and "low pressure compressor" referred to herein may alternatively be known as the "intermediate pressure turbine" and "intermediate pressure compressor". Where such alternative nomenclature is used, the fan 23 may be referred to as a first, or lowest pressure, compression stage.

Figure 3:
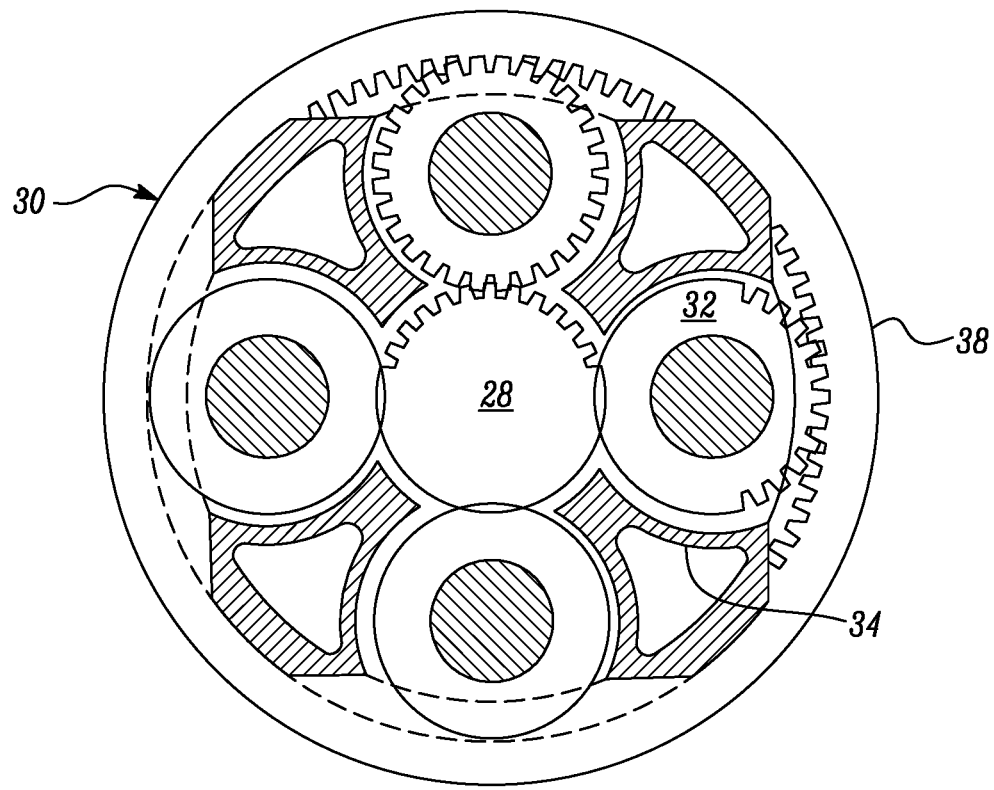
FIG. 3 is a partially cut-away view of a gearbox for a gas turbine engine.

The epicyclic gearbox 30 is shown by way of example in greater detail in FIG. 3. Each of the sun gear 28, planet gears 32 and ring gear 38 comprise teeth about their periphery to intermesh with the other gears. However, for clarity only exemplary portions of the teeth are illustrated in FIG. 3. There are four planet gears 32 illustrated, although it will be apparent to the skilled reader that more or fewer planet gears 32 may be provided within the scope of the disclosure. Practical applications of a planetary epicyclic gearbox 30 generally comprise at least three planet gears 32.

The epicyclic gearbox 30 illustrated by way of example in FIGS. 2 and 3 is of the planetary type, in that the planet carrier 34 is coupled to an output shaft via linkages 36, with the ring gear 38 fixed. However, any other suitable type of epicyclic gearbox 30 may be used. By way of further example, the epicyclic gearbox 30 may be a star arrangement, in which the planet carrier 34 is held fixed, with the ring (or annulus) gear 38 allowed to rotate. In such an arrangement the fan 23 is driven by the ring gear 38. By way of further alternative example, the gearbox 30 may be a differential gearbox in which the ring gear 38 and the planet carrier 34 are both allowed to rotate.

It will be appreciated that the arrangement shown in FIGS. 2 and 3 is by way of example only, and various alternatives are within the scope of the present disclosure. Purely by way of example, any suitable arrangement may be used for locating the gearbox 30 in the engine 10 and/or for connecting the gearbox 30 to the engine 10. By way of further example, the connections (such as the linkages 36, 40 in the FIG. 2 example) between the gearbox 30 and other parts of the engine 10 (such as the input shaft 26, the output shaft and the fixed structure 24) may have any desired degree of stiffness or flexibility. By way of further example, any suitable arrangement of the bearings between rotating and stationary parts of the engine (for example between the input and output shafts from the gearbox and the fixed structures, such as the gearbox casing) may be used, and the disclosure is not limited to the exemplary arrangement of FIG. 2. For example, where the gearbox 30 has a star arrangement (described above), the skilled person would readily understand that the arrangement of output and support linkages and bearing locations would typically be different to that shown by way of example in FIG. 2.

Accordingly, the present disclosure extends to a gas turbine engine having any arrangement of gearbox styles (for example star or planetary), support structures, input and output shaft arrangement, and bearing locations.

Optionally, the gearbox may drive additional and/or alternative components (e.g. the intermediate pressure compressor and/or a booster compressor).

Other gas turbine engines to which the present disclosure may be applied may have alternative configurations. For example, such engines may have an alternative number of compressors and/or turbines and/or an alternative number of interconnecting shafts. By way of further example, the gas turbine engine shown in FIG. 1 has a split flow nozzle 18, 20 meaning that the flow through the bypass duct 22 has its own nozzle 18 that is separate to and radially outside the core engine nozzle 20. However, this is not limiting, and any aspect of the present disclosure may also apply to engines in which the flow through the bypass duct 22 and the flow through the core 11 are mixed, or combined, before (or upstream of) a single nozzle, which may be referred to as a mixed flow nozzle. One or both nozzles (whether mixed or split flow) may have a fixed or variable area. Whilst the described example relates to a turbofan engine, the disclosure may apply, for example, to any type of gas turbine engine. In some arrangements, the gas turbine engine 10 may not comprise a gearbox 30.

The geometry of the gas turbine engine 10, and components thereof, is defined by a conventional axis system, comprising an axial direction (which is aligned with the rotational axis 9), a radial direction (in the bottom-to-top direction in FIG. 1), and a circumferential direction (perpendicular to the page in the FIG. 1 view). The axial, radial and circumferential directions are mutually perpendicular.

It will be understood that the disclosure is not limited to the embodiments above-described and various modifications and improvements can be made without departing from the concepts described herein. Except where mutually exclusive, any of the features may be employed separately or in combination with any other features and the disclosure extends to and includes all combinations and sub-combinations of one or more features described herein.

I claim:

1. A gas turbine engine for an aircraft comprising:
an engine core comprising a turbine, a compressor, and a core shaft connecting the turbine to the compressor;
a fan located upstream of the engine core, the fan comprising a plurality of fan blades;
a bypass duct delimited by a bypass duct inner wall and a bypass duct outer wall and located radially outwardly from the engine core and downstream of the fan; and
an outlet guide vane assembly, located within the bypass duct and, comprising a plurality of outlet guide vanes distributed circumferentially within the bypass duct, each outlet guide vane extending radially along a span between the bypass duct inner wall and the bypass duct outer wall,
wherein a space-chord ratio of at least one outlet guide vane of the plurality of outlet guide vanes, at 50% of a span length from the bypass duct inner wall, is less than 0.72,
wherein a space-chord ratio of at least one outlet guide vane of the plurality of outlet guide vanes at 70% of a span length from the bypass duct inner wall is at least 1.21 times, and less than 1.45 times, greater than the space-chord ratio of the at least one outlet guide vane at 50% of the span length from the bypass duct inner wall,
wherein the space-chord ratio is defined by an average spacing of the outlet guide vanes at a respective span height divided by a true chord length of the at least one outlet guide vane at the respective span height, wherein the average spacing of the outlet guide vanes at the respective span height is defined as a circumference of the bypass duct at the respective span height ($2\pi r$, where r is a radius at the respective span height from a principal rotational axis of the gas turbine engine) divided by the number of the outlet guide vanes ($N_V$), ($2\pi r/N_V$).

2. The gas turbine engine according to claim 1, wherein the space-chord ratio (s/c) of the at least one outlet guide vane at 50% of the span length from the bypass duct inner wall is less than 0.70.

3. The gas turbine engine according to claim 1, wherein at 50% of the span length from the bypass duct inner wall, the space-chord ratio of the at least one outlet guide vane is more than 0.4.

4. The gas turbine engine according to claim 1, wherein the space-chord ratio (s/c) of the at least one outlet guide vane at 70% of the span length from the bypass duct inner wall is less than 0.79.

5. The gas turbine engine according to claim 4, wherein at 70% of the span length from the bypass duct inner wall, the space-chord ratio of the at least one outlet guide vane is more than 0.48.

6. The gas turbine engine according to claim 1, wherein the space-chord ratio (s/c) of the at least one outlet guide vane, at a point from 60% to 70% of the span length from the bypass duct inner wall, is less than $$0.65+0.60*(\text{span height}-0.5)$$

wherein the span height is defined as a proportion of the span length from the bypass duct inner wall at said point to a total span length that is a length from the bypass duct inner wall to the bypass duct outer wall.

7. The gas turbine engine according to claim 1, the gas turbine engine further comprising:
a gearbox configured to receive an input from the core shaft and output drive to the fan so as to drive the fan at a lower rotational speed than the core shaft, and wherein the gearbox has a gear ratio in a range of from 3 to 4.2.

8. The gas turbine engine according to claim 1, wherein:
the turbine is a first turbine, the compressor is a first compressor, and the core shaft is a first core shaft;
the engine core further comprises a second turbine, a second compressor, and a second core shaft connecting the second turbine to the second compressor; and the second turbine, second compressor, and second core shaft are arranged to rotate at a higher rotational speed than the first core shaft.

9. A gas turbine engine for an aircraft comprising:

an engine core comprising a turbine, a compressor, and a core shaft connecting the turbine to the compressor;

a fan located upstream of the engine core, the fan comprising a plurality of fan blades;

a bypass duct delimited by a bypass duct inner wall and a bypass duct outer wall and located radially outwardly from the engine core and downstream of the fan; and an outlet guide vane assembly, located within the bypass duct and, comprising a plurality of outlet guide vanes distributed circumferentially within the bypass duct, each outlet guide vane extending radially along a span between the bypass duct inner wall and a bypass duct outer wall, wherein a space-chord ratio of at least one outlet guide vane of the plurality of outlet guide vanes at 70% of a span length from the bypass duct inner wall is at least 1.21 times, and less than 1.45 times, greater than the space-chord ratio of the at least one outlet guide vane at 50% of the span length from the bypass duct inner wall, wherein the space-chord ratio of the at least one outlet guide vane at 50% of the span length from the bypass duct inner wall is less than 0.65, wherein the space-chord ratio is defined by an average spacing of the outlet guide vanes at a respective span height divided by a true chord length of the at least one outlet guide vane at the respective span height, wherein the average spacing of the outlet guide vanes at the respective span height is defined as a circumference of the bypass duct at the respective span height ($2\pi r$, where r is a radius at the respective span height from a principal rotational axis of the gas turbine engine) divided by the number of the outlet guide vanes ($N_V$), ($2\pi r/N_V$).

10. The gas turbine engine according to claim 9, wherein the space-chord ratio (s/c) of the at least one outlet guide vane at 70% of the span length from the bypass duct inner wall is less than 0.79.

11. The gas turbine engine according to claim 9, the gas turbine engine further comprising:

a gearbox configured to receive an input from the core shaft and output drive to the fan so as to drive the fan at a lower rotational speed than the core shaft, and wherein the gearbox has a gear ratio in a range of from 3.1 to 4.2.

* * * * *